US008012029B2

(12) United States Patent
Johnson

(10) Patent No.: US 8,012,029 B2
(45) Date of Patent: Sep. 6, 2011

(54) SHUFFLING APPARATUS AND METHOD

(75) Inventor: Rodney G. Johnson, Mudgeeraba (AU)

(73) Assignee: Shuffle Master, Inc., Las Vegas, NV (US)

(*) Notice: Subject to any disclaimer, the term of this patent is extended or adjusted under 35 U.S.C. 154(b) by 978 days.

(21) Appl. No.: 11/881,685

(22) Filed: Jul. 27, 2007

(65) Prior Publication Data

US 2007/0272600 A1 Nov. 29, 2007

Related U.S. Application Data

(63) Continuation of application No. 09/919,596, filed on Jul. 31, 2001, now Pat. No. 6,676,127, which is a continuation-in-part of application No. 09/380,943, filed as application No. PCT/AU98/00157 on Mar. 13, 1998, now Pat. No. 6,267,248.

(51) Int. Cl.
*A63F 13/00* (2006.01)

(52) U.S. Cl. ............... 463/47; 273/149; 463/22; 463/11

(58) Field of Classification Search .................... 463/11, 463/22, 47; 273/149
See application file for complete search history.

(56) References Cited

U.S. PATENT DOCUMENTS

| | | | | |
|---|---|---|---|---|
| 1,885,276 | A | 11/1932 | McKay | |
| 2,001,220 | A | 5/1935 | Smith | |
| 2,016,030 | A | 10/1935 | Woodruff et al. | |
| 2,778,644 | A | 1/1955 | Stephenson | |
| 2,950,005 | A | 8/1960 | MacDonald | |
| 3,595,388 | A | 7/1971 | Castaldi | |
| 3,897,954 | A | 8/1975 | Erickson et al. | |
| 4,339,134 | A | 7/1982 | Macheel | 463/12 |
| 4,388,994 | A | 6/1983 | Suda et al. | |
| 4,497,488 | A | 2/1985 | Plevyak | |
| 4,512,580 | A | 4/1985 | Matviak | |
| 4,513,969 | A | 4/1985 | Samsel, Jr. | |
| 4,515,367 | A | 5/1985 | Howard | |
| 4,586,712 | A | 5/1986 | Lorber | |
| 4,659,082 | A | 4/1987 | Greenberg | |
| 4,662,637 | A | 5/1987 | Pfeiffer | |
| 4,667,959 | A | 5/1987 | Pfeiffer | |
| 4,759,448 | A | 7/1988 | Kawabata | |
| 4,770,421 | A | 9/1988 | Hoffman | |
| 4,807,884 | A | 2/1989 | Breeding | |
| 4,832,342 | A | 5/1989 | Plevyak et al. | 273/149 R |

(Continued)

FOREIGN PATENT DOCUMENTS

WO WO 87/00764 2/1987

(Continued)

OTHER PUBLICATIONS

1/3" B/W CCD Camera Module EB100 by EverFocus Electronics Corp.

(Continued)

*Primary Examiner* — Peter DungBa Vo
*Assistant Examiner* — Jeffrey Wong
(74) *Attorney, Agent, or Firm* — Mark A. Litman & Associates, P.A.

(57) ABSTRACT

A card shuffling device reads suit and value of individual cards that are moved through the card shuffler. Reading of the cards is effected after cards have been received into a card holding area and before cards have been delivered into a card collection area from which cards are removed from the device for use.

9 Claims, 2 Drawing Sheets

U.S. PATENT DOCUMENTS

| | | | | |
|---|---|---|---|---|
| 4,876,000 | A | 10/1989 | Mikhail | |
| 4,921,109 | A * | 5/1990 | Hasuo et al. | 209/552 |
| 4,969,648 | A | 11/1990 | Hollinger et al. | |
| 5,000,453 | A | 3/1991 | Stevens et al. | |
| 5,121,921 | A | 6/1992 | Friedman et al. | |
| 5,240,140 | A | 8/1993 | Huen | |
| 5,248,142 | A | 9/1993 | Breeding | |
| 5,356,145 | A | 10/1994 | Verschoor | |
| 5,374,061 | A | 12/1994 | Albrecht | 273/149 R |
| 5,382,024 | A | 1/1995 | Blaha | |
| 5,431,399 | A | 7/1995 | Kelley | 273/149 P |
| 5,584,483 | A | 12/1996 | Sines et al. | 273/149 R |
| 5,605,334 | A | 2/1997 | McCrea, Jr. | |
| 5,632,483 | A | 5/1997 | Garczynski et al. | |
| 5,681,039 | A | 10/1997 | Miller | |
| 5,683,085 | A | 11/1997 | Johnson et al. | |
| 5,695,189 | A | 12/1997 | Breeding et al. | |
| 5,722,893 | A | 3/1998 | Hill et al. | |
| 5,944,310 | A | 8/1999 | Johnson et al. | |
| 5,989,122 | A * | 11/1999 | Roblejo | 463/22 |
| 6,039,650 | A | 3/2000 | Hill | 463/47 |
| 6,068,258 | A | 5/2000 | Breeding et al. | |
| 6,117,012 | A | 9/2000 | McCrea, Jr. | 463/27 |
| 6,126,166 | A | 10/2000 | Lorson et al. | |
| 6,149,154 | A | 11/2000 | Grauzer et al. | 273/149 R |
| 6,213,310 | B1 | 4/2001 | Wennersten et al. | |
| 6,250,632 | B1 | 6/2001 | Albrecht | |
| 6,254,096 | B1 * | 7/2001 | Grauzer et al. | 273/149 R |
| 6,267,248 | B1 | 7/2001 | Johnson et al. | |

FOREIGN PATENT DOCUMENTS

| | | |
|---|---|---|
| WO | WO 00/51076 | 8/2000 |

OTHER PUBLICATIONS

CD Labeled "Shuffler Art." There is a self-executing function on the CD so that, upon entering the Spread Sheet of content, individual items may be opened directly from the spread sheet according to the title of the document.

DVD Labeled "Luciano Decl. Ex. K." This is the videotaped live declaration of Mr. Luciano taken during preparation of litigation.

DVD labeled "Solberg Decl. Ex. C." This is the videotaped live declaration of Mr. Solberg, a witness for the defense, taken during preparation for litigation.

DVD labeled "Morrill Decl. Ex. A." This is the videotaped live declaration of Mr. Robert Morrill, a lead trial counsel for the defense, taken during preparation for litigation. He is describing the operation of Roblejo Prototype device.

DVD labeled Exhibit 1. This is a DVD taken by Shuffle Mater personnel of the live operation of a CARD One-Two-Six™ shuffler.

Specification of Australian Patent Application No. 31577/95, filed Jan. 17, 1995, Applicants Rodney G. Johnson, et al., Title: Card Handling Apparatus.

Specification of Australian Patent Application No. not listed, filed Aug. 15, 1994, Applicants Rodney G. Johnson, et al., Title: Card Handling Apparatus.

* cited by examiner

SHUFFLING APPARATUS AND METHOD

RELATED APPLICATIONS DATA

This application is a Continuation of U.S patent application Ser. No. 09/919,596filed Jul. 31, 2001, now U.S. Pat. No. 6,676,127 for COLLATING AND SORTING APPARATUS; now Issued U.S. Pat. No. 6,676,127, which in turn, is a continuation-in-part of U.S. patent application Ser. No. 09/380, 943 filed Sep. 13, 1999, now U.S. Pat. No. 6,267,248 for COLLATING AND SORTING APPARATUS, which in turn is based on PCT Application Serial No. PCT/AU98/00157 filed Mar. 13, 1998 in Australia.

BACKGROUND OF THE INVENTION

1. Field of the Invention

This invention relates to collation and/or sorting of groups of articles. In particular, this invention relates to shuffling and sorting apparatus for providing randomly collated groups of articles and/or collated groups of articles according to a predetermined order.

This invention can be utilised to collate and sort groups of articles which have distinguishing characteristics which can be machine identified. However it has particular relevance to shuffling and sorting playing cards and reference will be made hereinafter to such application by way of illustration of the invention.

2. Background of the Invention

In the gaming industry many packs of cards are utilised and it is necessary to shuffle one or more decks of cards for game use and/or after each game to sort the cards into one or more packs for re-use either in a specific order or at least into a pack of cards which is complete. At present this is achieved manually.

SUMMARY OF THE INVENTION

This invention aims to provide a collation and/or sorting apparatus which will operate efficiently and accurately.

With the foregoing in view, this invention in one aspect resides broadly in collation and/or sorting apparatus including: sensor means to identify articles for collation and/or sorting; feed means for feeding said articles sequentially past the sensor means; storing means in which articles may be collated in groups in a desired order; selectively programmable computer means coupled to said sensor means and to said storing means to assemble in said storing means groups of articles in a desired order; delivery means for selectively delivering the individual articles into the storing means, and collector means for collecting collated groups of articles. The sensor means may include means to identify the presence of an article. Suitably the sensor means includes means to identify one or more physical attributes of an article. Preferably the sensor means includes means to identify indicia on a surface of an article.

The desired order may be a specific order of a set of articles, such as a deck of cards to be sorted into its original pack order, or it may be a random order into which a complete set of articles is delivered from a plurality of sets of randomly arranged articles For example, the desired order may be a complete pack of playing cards sorted from holding means which holds a plurality of randomly oriented cards forming a plurality of packs of cards. This may be achieved by identifying the individual cards by optical readers, scanners or any other means and then under control of a computer means such as a micro-processor, placing an identified card into a specific collector means to ensure delivery of complete decks of cards in the desired order. A random number generator is used to place individual cards into random positions to ensure random delivery of one to eight or more decks of cards. In one aspect the apparatus is adapted to provide one or more shuffled packs of cards, such as eight packs for the game of baccarat.

The storing means may have individual storing spaces for each respective article to be provided as the collated and/or sorted stack of articles. In such arrangement the delivery means delivers identified articles to the respective storing spaces. This may be achieved by arranging the delivery means with travel means movable along a plurality of axes such as laterally to a column of individual storing spaces and vertically along the column.

Preferably however, the storing means is arranged as one or more rotatable storage magazines and the delivery means includes a delivery carriage movable to a respective magazine and drive means for rotating the magazine to operatively align a respective storing space with the delivery carriage.

The collector means may be arranged to receive articles from the storing means as a collated group of articles. For example, the storing means may simultaneously release all the articles therein into the collector means which may be a confining chute in which the articles settle as a group. Preferably however, the collector means operates after a complete set of articles has been collated in the storing means and sequentially feeds the sorted articles into one or more discrete groups.

The sensor means may be any suitable means for identifying a physical characteristic of the articles to be sorted or it may comprise sensor means for detecting and/or interpreting electromagnetic signals reflected and/or transmitted by an article.

One form of the invention is provided as a sorting apparatus for providing a pack of playing cards arranged in original deck order and includes: sensor means able to identify the suit and value of individual cards; feed means for feeding the said cards sequentially past the sensor means; storing means having individual storing spaces for each respective card of a deck of cards; selectively programmable computer means coupled to said sensor means and said storing means to assemble in said storing means individual cards comprising a complete deck or respective decks of cards; delivery means for delivering the identified cards or collated decks thereof to pre-selected individual storing spaces, and collector means for collecting one or more decks of cards. Another form of the invention comprises a card shuffling device to randomly shuffle one or more decks of cards.

Preferably the storing means is arranged as one or more rotatable magazines and the delivery means includes a delivery carriage which receives identified cards from the feed means and is movable along a horizontal drive path in front of a plurality of magazines arranged co-axially and with their common axis parallel to the drive path and which are rotatable together or independently by the computer means to operatively align a respective storing space with the delivery carriage.

The respective storing spaces may include retention means adapted to captively hold a delivered card therein.

The retention means may comprise a vacuum clamping means but preferably the magazine is formed as a quadrant having a lower shroud which prevents dislodgement of the cards from the storing spaces when in an inverted position.

After collation of one or more decks, the magazine or each magazine may be rotated to sequentially engage retained cards with conveying means which conveys collated decks of cards which sequentially come into engagement therewith to a collector means.

BRIEF DESCRIPTION OF THE DRAWINGS

In order that this invention may be more readily understood and put into practical effect, reference will be made to accompanying drawings which illustrate schematically one embodiment of playing card sorting and or shuffling apparatus, wherein.

DETAILED DESCRIPTION OF THE DRAWINGS

Figure 1:
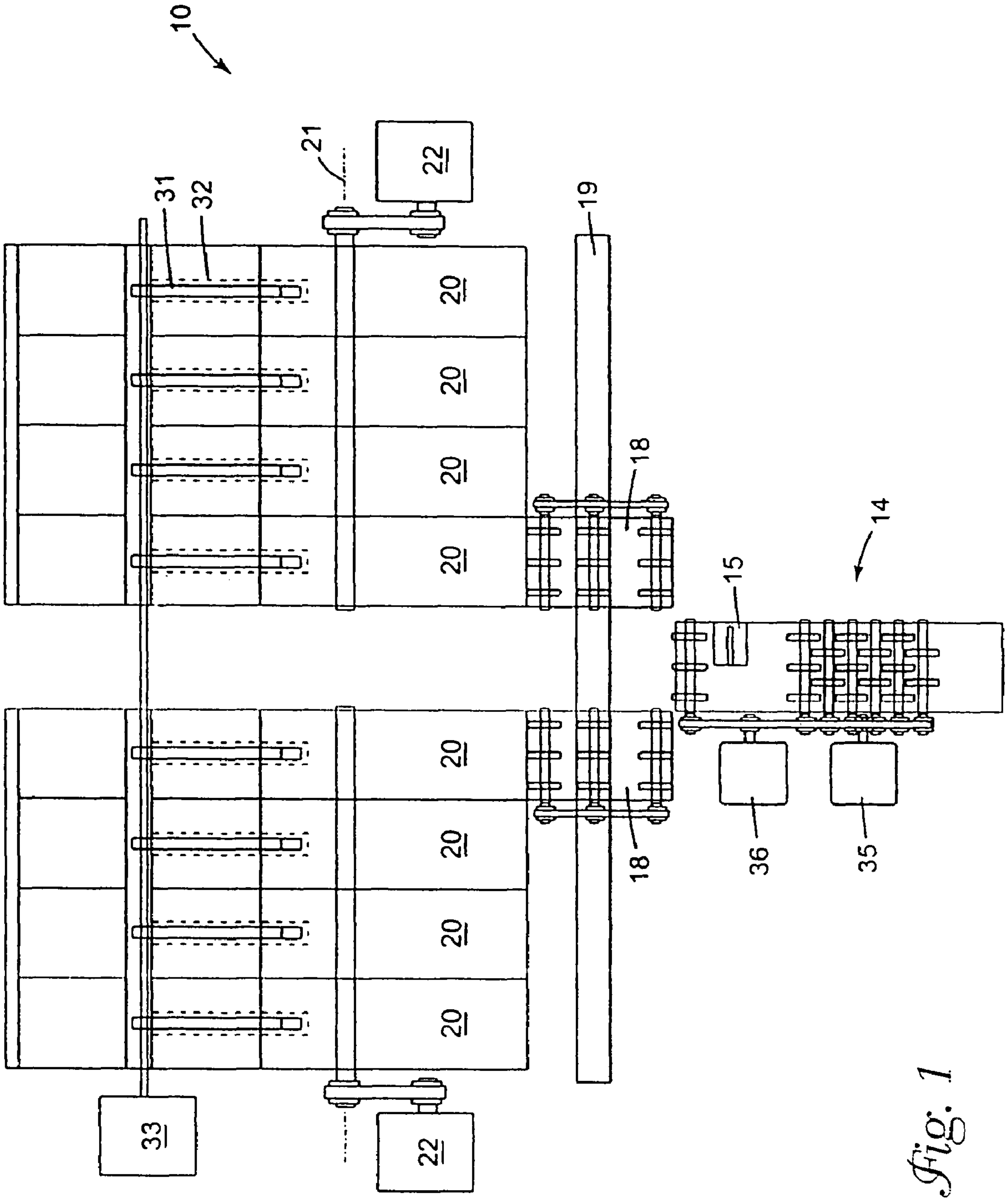
FIG. 1 is a plan view of the apparatus.
Figure 2:
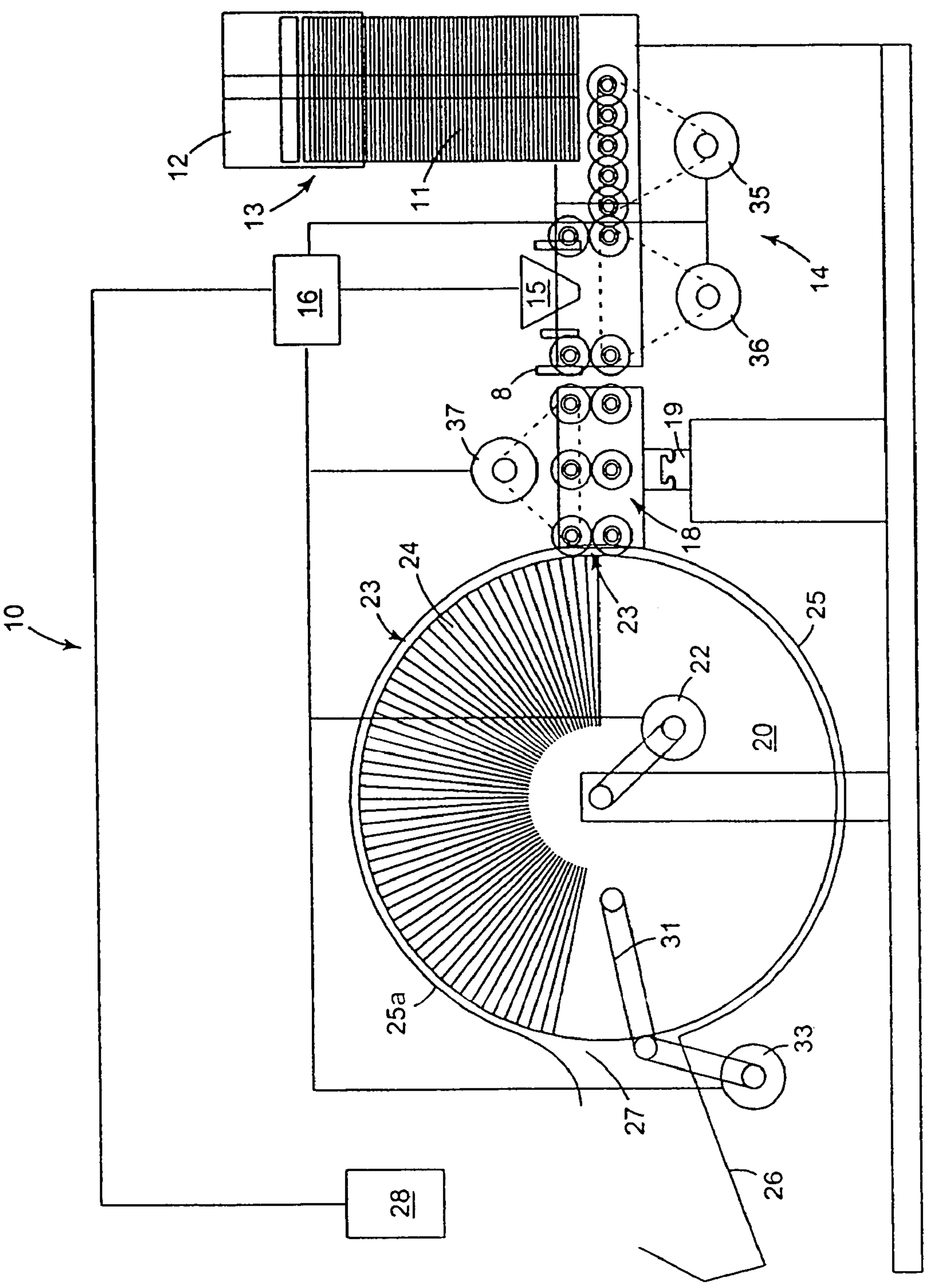
FIG. 2 is a typical sectional view of the apparatus.

The collating apparatus 10 for providing sorted and/or shuffled decks of playing cards from a stack of cards 11 includes holding means 12 for holding the cards in a vertical column 13 above card feed means 14 which feeds the lowermost card of the stack past the sensor 15 which is coupled to a microprocessor 16 to record either the presence of a card and/or the identity of a card by its suit and value. Microprocessor 16 is also coupled to drive motors 35, 36 of feed means 14, respective drive means (not shown) for transverse movement of each carriage 18, card transport drives 37 associated with carriages 18, magazine drives 22 and drive 33 associated with unloading conveyors 31 for selective coordinated operation to collate packs of shuffled or sorted cards.

The feeding means 14 delivers each card past the sensor 15 to a selected one of a pair of delivery carriages 18. Each delivery carriage 18 is movable along a common horizontal track 19, transverse to the direction of movement of the cards from the feed means 14, and disposed in front of a plurality of card magazines 20 arranged co-axially and with their common axis 21 parallel to the drive path 19. In this embodiment there are two banks of four magazines 20 arranged in side by side relationship at opposite sides of the feeding means 14.

Each bank of magazines 20 is driven by a motor 22 which is suitably a reversible stepper motor or by a motor drive and brake system to achieve selective incremental rotation of magazines 20 to align openings 23 of card storing spaces 24 with delivery carriages 18 to permit a card to be inserted into a respective storing space 24.

A lower shroud 25 extends beneath the respective banks of magazines 20 to maintain the cards in their respective individual storing spaces 24 and an upper shroud 25*a* terminating in outlet port 27 prevents interference with what otherwise would be exposed storing spaces in the upper part of magazine 20. Shroud 25 extends from the delivery carriages to an associated collecting tray 26 adapted to hold respective card packs.

As illustrated there are fifty-six individual storing spaces 24 arranged in an upper sector of the magazine and these radiate outwardly from the axis 21 and fill the space between the outlet port 27, adjacent an unloading conveyor 31, and the output of the delivery carriages 18.

Thus the drive motor 22 may be actuated to position any one of the fifty-six individual storing spaces 24 in operative alignment with the output of delivery carriages 18 while maintaining the rearmost storing space 24 clear of the unloading conveyor 31.

Individual motors 35 and 36 control the feeding of the cards from the column 13 and from the field of sensor 15 and further motors 37 on respective delivery carriages 18 control movement of the cards thereon into the storage spaces 24. A further motor, not illustrated, controls the movement of each delivery carriage 18 and may be a motor driving a transverse screw shaft coupled to the carriages or a belt drive or other means of driving to control their transverse travel.

In a sorting mode, microprocessor or like programmable control means 16 operates to feed cards from the column 13 sequentially past the sensor 15 which identifies each individual card and commits it to memory with an identification such as a number which corresponds to the sequentially identified storage spaces 24 of a particular magazine 20. More than one deck of cards can be identified and the program will select between these when sorting. Thus when the cards are next fed from the column 13 they will be recognised and fed to a corresponding storage space 24 in a respective magazine 20.

Once a storage space 24 is filled the next card so identified will be fed to an allocated storage space 24 in the same magazine unless a card of identical suit and value previously has been identified in which case that card is allocated to a respective storage space 24 in one of the other magazines 20. This process is repeated until all cards have been sorted and stored.

Thereafter, the magazines are rotated anticlockwise as shown towards the unloading conveyors 31 driven in unison by motor 33 until respective conveyors 31 are contacted by the first card in each magazine 20 which card thus will be discharged to the collector tray 26. Unloading conveyors 31 are narrow belts aligned with slotted apertures 32 extending radially of the respective radial walls forming storing spaces 24. The further cards in each magazine will then be sequentially discharged to the collector tray 26 to form packs of sorted cards.

If at the end of sorting any deck of cards is incomplete or over supplied a warning signal will be actuated in association with that deck to indicate the incomplete or oversupplied stack of cards. By actuating an LCD or LED display 28 this will indicate which card is missing or over supplied and will also then indicate any other deck which is incomplete or over supplied. The LCD or LED display 28 may, if required indicate the magazine location in which a card is undersupplied or oversupplied to form a complete deck.

It will be seen that the illustrated apparatus may have eight or more or less magazines arranged in groups of four or more or less with common actuation of the unloading conveyor and separate operation of the motors which control their pivotal position.

In a shuffling mode for a single pack of cards, sensor 15 may or may not be actuated to detect the suit and value of each card. If it is not required to determine the integrity of a pack of cards other than completeness by counting the number of cards, sensor 15 may be actuable to detect only the presence of a card as it passes from feeding means 14 to delivery carriage 18.

As each card is passed beneath sensor 15 its presence is detected and microprocessor 16, using a random number generator, randomly allocates that card to a predetermined one of the fifty six storage spaces 24 of magazine 20. Microprocessor 16 then controls drive motors 36, 37 and 22 to effect delivery of the card into the randomly predetermined storage space 24.

When the magazine is full and up to fifty six cards have been accounted for, magazine 20 is rotated anticlockwise to permit conveyor 31 to discharge a pack of randomly ordered or "shuffled" cards into collector tray 26.

On the other hand, if a multiplicity of decks is to be shuffled for reuse in a game such as baccarat employing like decks of shuffled cards, it may be important to produce eight individually shuffled decks and/or to determine whether cards have been removed or added to the eight deck stack of cards retrieved from the playing table.

In this case sensor 15 would be operated to determine not only the presence of a card on feed means 14 but also the suit and value of each card to enable loading of the eight magazines each with a randomly ordered or shuffled deck of cards which is otherwise complete.

It will of course be realised that while the above has been given by way of illustrative example of this invention, all such and other modifications and variations hereto. As would be apparent to persons skilled in the art, are deemed to fall within the broad scope and ambit of this invention as is herein set forth.

For example a reject mechanism 8 may be associated with the sensor 15 to cause duplicate or oversupplied cards to be rejected before delivery by delivery means 18 to the magazine 20. The reject mechanism 8 may comprise an electromechanical device or air blast means coupled to a microprocessor 16.

The rotatable magazine 20 may be substituted by a vertically displaceable magazine or any other storage device having a plurality of storage spaces to receive individual cards. Similarly for other applications the holding means 12 and feeding means 14 may be replaced by a rotary turntable having a selectively actuable finger guide to remove articles from the turntable.

It readily will be apparent to a skilled addressee that the apparatus according to the invention will have an application in the collation and packaging of cards during their manufacture to ensure the integrity of each set of cards produced.

Equally, it readily will be apparent to a skilled addressee that the invention, with suitable modifications, will have wide application in fields where sets of articles are to be collated and bundled in a predetermined order or in a random order or otherwise where the grouping or collation of articles by number and/or order is essential.

Such applications may include collation of book pages in the correct order with a mixture of black and white and coloured pages from different printing presses; packaging of mixed sets of food items i.e., breakfast cereal: dispensing and packaging of mixtures of pills for patients on a daily or weekly basis; sorting and packaging of eggs or fruit by size and/or colour; sorting and collation of mail by zip code; sorting and collation of bank cheques by payee, payer or bank; collation and sorting of bank notes by denomination, condition or integrity or even sorting and collation of doctors prescription forms to monitor information on patients, drug prescribed, pharmacy or prescribing doctor.

The present invention is able to collate and/or sort articles by physical attributes such as size, colour, shape, mass (e.g., by load cell or the like) or surface indicia or any combination thereof.

What is claimed:

1. A card verification device, comprising:

a card holding area;

a card collection area;

a card transfer mechanism configured to move cards from the card holding area to the card collection area;

a sensor configured to read a suit and rank of each card individually passing between the card holding area and card collection area; and a display configured to display the suit and rank of at least one card passing between the card holding area and card collection area;

wherein the card verification device verifies that the set of cards formed in the card collecting area is a complete set of cards as compared to a predetermined identification of a complete set; and wherein the display is configured to display the suit and rank of at least one of a) a missing card as compared to a predetermined set thereof; and b) an oversupplied card as compared to a predetermined set thereof.

2. The card verification device of claim 1, wherein the display is an LCD or LED display.

3. The card verification device of claim 1, wherein the sensor is intermediate the card holding area and card collection area.

4. A card verification device, comprising:

a card holding area;

a card randomization area;

a card transfer mechanism configured to move cards from the card holding area to the card randomization area;

a sensor configured to read a suit and rank of cards passing between the card holding area and the card randomization area; and a display configured to display the suit and rank of at least one card passing between the card holding area and card randomization area, wherein the display is configured to display the suit and rank of at least one of a) a missing card as compared to a predetermined set thereof; and b) an oversupplied card as compared to a predetermined set thereof.

5. A card verification device, comprising:

a card in-feed area;

a card moving mechanism;

a card discharge area;

a microprocessor programmed to control operation of the card verification device;

a first card feeder that begins transfer of cards from the card in-feed area to the card discharge area;

a second card feeder that completes the transfer of cards from the card in-feed area to the card discharge area;

a sensor configured to read a suit and rank of cards passing between the card in-feed area and card discharge area; and a display configured to display the suit and rank of at least one card passing between the card in-feed area and card discharge area, wherein the display is configured to display the suit and rank of at least one of a) a missing card as compared to a predetermined set thereof; and b) an oversupplied card as compared to a predetermined set thereof.

6. The card verification device of claim 5, wherein the display is a LCD or LED display.

7. The card verification device of claim 5, wherein the sensor is intermediate the card in-feed area and card discharge area.

8. The card verification device of claim 4, wherein the display is an LCD or LED display.

9. The card verification device of claim 4, wherein the sensor is intermediate the card holding area and card randomization area.

* * * * *